(12) United States Patent
Jung et al.

(10) Patent No.: US 8,126,033 B2
(45) Date of Patent: Feb. 28, 2012

(54) APPARATUS AND METHOD FOR RELAYING IN A WIRELESS COMMUNICATION SYSTEM

(75) Inventors: Young-Ho Jung, Suwon-si (KR); Yu-Seok Kim, Seoul (KR); Hyun-Jong Yang, Daejeon (KR); Kyung-Chun Lee, Goyang-si (KR); Joo-Hwan Chun, Daejeon (KR)

(73) Assignees: Samsung Electronics Co., Ltd., Suwon-si (KR); Korea Advanced Institute of Science and Technology, Daejeon Metropolitan (KR)

( * ) Notice: Subject to any disclaimer, the term of this patent is extended or adjusted under 35 U.S.C. 154(b) by 1102 days.

(21) Appl. No.: 11/946,178

(22) Filed: Nov. 28, 2007

(65) Prior Publication Data

US 2008/0125032 A1 May 29, 2008

(30) Foreign Application Priority Data

Nov. 29, 2006 (KR) ........................ 10-2006-0118733

(51) Int. Cl.
*H04B 3/36* (2006.01)

(52) U.S. Cl. ........ 375/211; 375/214; 375/219; 370/312; 370/315; 370/328; 455/7; 455/11.1; 455/13.1; 455/15

(58) Field of Classification Search .................. 375/316, 375/211, 214, 219; 455/7, 11.1, 13.1, 15; 370/328, 315, 312
See application file for complete search history.

(56) References Cited

U.S. PATENT DOCUMENTS

| 5,596,439 | A | * | 1/1997 | Dankberg et al. | ............... | 398/35 |
| 6,154,502 | A | * | 11/2000 | Brun et al. | ..................... | 375/261 |
| 7,145,964 | B2 | * | 12/2006 | Hoffmann et al. | ............ | 375/298 |
| 7,336,930 | B2 | * | 2/2008 | Larsson et al. | ............... | 455/63.1 |
| 7,920,501 | B2 | * | 4/2011 | Larsson et al. | ................ | 370/315 |
| 2004/0237117 | A1 | * | 11/2004 | Park et al. | ...................... | 725/131 |
| 2007/0116092 | A1 | * | 5/2007 | Nystrom et al. | .............. | 375/130 |

OTHER PUBLICATIONS

Popovski et al. , "The Anti-Packets Can Increase the Achievable Throughput of a Wireless Multi-Hop Network", IEEE Jun. 2006.*
Petar Popovski et al., Bi-directional Amplification of Throughput in a Wireless Multi-Hop Network, IEEE, 2006.
Petar Popovski et al., Bi-directional Amplification of Throughput in a Wireless Multi-Hop Network, Proc. 63rd IEEE Vehicular Technology Conference, May 7-10, 2006, pp. 588-593.

* cited by examiner

*Primary Examiner* — Chieh M Fan
*Assistant Examiner* — Sophia Vlahos
(74) *Attorney, Agent, or Firm* — Jefferson IP Law, LLP

(57) ABSTRACT

An apparatus and method for supporting relaying in a wireless communication system are provided. The apparatus and method include a transmitting apparatus which acquires channel information between the transmitting apparatus and an RS, pre-encodes a transmission signal to be transmitted to the RS with the channel information, transmits the pre-coded signal to the RS, and acquires, upon receipt of a signal from the RS, a signal transmitted by a receiving apparatus by eliminating the transmission signal transmitted to the RS from the received signal. Accordingly, the apparatus and method improve system capacity gain without adding time resources.

11 Claims, 13 Drawing Sheets

US 8,126,033 B2

APPARATUS AND METHOD FOR RELAYING IN A WIRELESS COMMUNICATION SYSTEM

PRIORITY

This application claims the benefit under 35 U.S.C. §119 (a) of a Korean patent application filed in the Korean Intellectual Property Office on Nov. 29, 2006 and assigned Serial No. 2006-0118733, the entire disclosure of which is hereby incorporated by reference.

JOINT RESEARCH AGREEMENT

The claimed invention was made by, on behalf of, and/or in connection with one or more of the following parties to a joint research agreement: Samsung Electronics Company, Inc. and Korea Advanced Institute of Science and Technology. The agreement was in effect on and before the date the claimed invention was made, and the claimed invention was made as a result of activities undertaken within the scope of the agreement.

BACKGROUND OF THE INVENTION

1. Field of the Invention

The present invention generally relates to a wireless communication system supporting relaying. More particularly, the present invention relates to an apparatus and method for increasing a capacity gain without adding time resources in a wireless communication system.

2. Description of the Related Art

In a wireless communication system, Mobile Stations (MSs) located at a service area boundary or in a shadowing area may suffer from a poor channel condition. Accordingly, the wireless communication system may adopt a relay scheme using Relay Stations (RSs) to improve the link performances of such MSs. The relay scheme provides high-rate data channels to the MSs, thereby increasing overall system performance and expanding service coverage.

FIG. 1 illustrates the configuration of a conventional wireless communication system supporting relaying.

Referring to FIG. 1, an MS 110 within the service area 101 of a BS 100 is connected to the BS 100 by a direct link. An MS 120, which is outside the service area 101 of the BS 100 and thus has a poor channel condition, is connected to the BS 100 by a relay link established with an RS 130.

Thus, via the RS 130, the BS 100 can communicate with MSs that otherwise have a poor channel condition because they are outside the service area 101 of the BS 100 or because they are in a shadowing area and suffering from a shielding effect due to buildings.

The wireless communication system supports relaying in three methods.

One of them is Time Division Duplexing (TDD) relaying as illustrated in FIG. 2.

FIG. 2 illustrates the configuration of a conventional broadband wireless communication system supporting TDD relaying.

Referring to FIG. 2, the wireless communication system supports relaying using four independent time resources. The time resources include two uplink time resources and two downlink time resources. For example, a BS 201 transmits a signal $\tilde{S}_1$ to an RS 203 in first time resources in step 211 and the RS 203 relays the received signal $\tilde{S}_1$ to an MS 205 in second time resources in step 213.

After receiving the signal $\tilde{S}_1$ from the RS 203, the MS 205 transmits a signal $\tilde{S}_2$ to the RS 203 in third time resources in step 215 and the RS 203 relays the received signal $\tilde{S}_2$ to the BS 201 in fourth time resources in step 217.

Another relaying method is coded bi-directional relaying, as illustrated in FIG. 3.

FIG. 3 illustrates the configuration of a conventional wireless communication system supporting coded bi-directional relaying.

Referring to FIG. 3, the wireless communication system supports relaying using three independent time resources. For example, a BS 301 transmits a downlink signal $\tilde{S}_1$ to an RS 303 in first time resources in step 311 and an MS 305 transmits an uplink signal $\tilde{S}_2$ to the RS 303 in second time resources in step 313. The downlink and uplink signals $\tilde{S}_1$ and $\tilde{S}_2$ from the BS 301 and the MS 305 are code symbols.

The RS 303 detects and decodes the code symbols $\tilde{S}_1$ and $\tilde{S}_2$. In step 315, the RS 303 performs an exclusive OR (XOR) operation of the symbols $\tilde{S}_1$ and $\tilde{S}_2$ and transmits the resulting symbol $\tilde{S}_3 = \tilde{S}_1 \oplus \tilde{S}_2$ to the BS 301 and the MS 305 in third time resources.

The BS 301 can detect the uplink signal $\tilde{S}_2$ from the signal $\tilde{S}_3$ received from the RS 303 by performing an XOR operation of $\tilde{S}_3$ with $\tilde{S}_1$. The MS 305 can also detect the downlink signal $\tilde{S}_1$ from the signal $\tilde{S}_3$ received from the RS 303 by performing an XOR operation of $\tilde{S}_3$ with $\tilde{S}_2$.

The other relaying method is multi-user and Spatial Division Multiple Access (SDMA) relaying, as illustrated in FIG. 4.

FIG. 4 illustrates the configuration of a conventional wireless communication system supporting multi-user SDMA relaying.

Referring to FIG. 4, the wireless communication system supports relaying using two independent time resources. For example, a BS 401 and an MS 405 transmit signals $\tilde{S}_1$ and $\tilde{S}_2$ to an RS 403 in first time resources in 411 and the RS 403 relays the signals $\tilde{S}_1$ and $\tilde{S}_2$ to the MS 405 and the BS 401, respectively in second time resources in step 413. That is, the RS 403 can detect the signals $\tilde{S}_1$ and $\tilde{S}_2$ by a multi-user detection scheme used for a multi-antenna system, considering that the BS 401 and the MS 405 are multi-users. The RS 403 can then transmit a signal $\tilde{S}_3$ which includes the signals $\tilde{S}_1$ and $\tilde{S}_2$ as given by $$\tilde{S}_3 = \begin{bmatrix} H^T \\ G \end{bmatrix}^{-1} \begin{bmatrix} \tilde{S}_2 \\ \tilde{S}_1 \end{bmatrix}$$

to the MS 405 and the BS 401 in the same time resources.

As described above, relaying in the wireless communication systems improves the link performances of MSs at a cell boundary and expands coverage.

However, the TDD relaying consumes twice as many resources as the multi-user SDMA relaying. The coded bi-directional relaying does not maximize an overall system capacity gain due to the use of three independent time resources. The multi-user SDMA relaying also has a shortcoming in that, since an RS treats a BS and an MS as multi-users and thus the BS and the MS share spatial resources of the RS, the number of streams exchanged between the BS and the MS is limited by the number of RS antennas. The multi-user SDMA relaying also increases the complexity of the RS because the RS uses the multi-user detection scheme of the multi-antenna system. Moreover, if the BS, the MS and the RS each have a single antenna, the multi-user SDMA relaying is not viable.

SUMMARY OF THE INVENTION

An aspect of the present invention is to address at least the above-mentioned problems and/or disadvantages and to provide at least the advantages described below. Accordingly, an aspect of the present invention is to provide an apparatus and method for supporting relaying without adding time resources in a wireless communication system.

Another aspect of the present invention is to provide an apparatus and method for relaying to improve a system capacity gain without adding time resources in a wireless communication system.

In accordance with an aspect of the present invention, a method for supporting relaying in a transmitting apparatus in a wireless communication system is provided. The method includes acquiring channel information between the transmitting apparatus and a Relay Station (RS), pre-encoding a transmission signal to be transmitted to the RS with the channel information, transmitting the pre-coded signal to the RS, and acquiring, upon receipt of a signal from the RS, a signal transmitted by a receiving apparatus by eliminating the transmission signal transmitted to the RS from the received signal.

In accordance with another aspect of the present invention, a method for supporting relaying in a Relay Station (RS) in a wireless communication system is provided. The method includes monitoring reception of signals from a Base Station (BS) and a Mobile Station (MS) in the same time resources, and transmitting, upon receipt of the signals from the BS and the MS, the sum of the received signals to the BS and the MS in the same time resources.

In accordance with a further aspect of the present invention, a transmitting apparatus for supporting relaying in a wireless communication system is provided. The apparatus includes a transmitter for pre-encoding a transmission signal to be transmitted to a Relay Station (RS) with channel information between the transmitting apparatus and an RS and for transmitting the pre-coded signal to the RS, and a receiver for detecting a signal transmitted by a receiving apparatus by eliminating the transmission signal transmitted to the RS from a signal received from the RS.

In accordance with still another aspect of the present invention, an apparatus of a Relay Station (RS) for supporting relaying in a wireless communication system is provided. The apparatus includes a receiver for receiving signals from a Base Station (BS) and a Mobile Station (MS) in the same time resources, and a transmitter for transmitting the sum of the received signals to the BS and the MS in the same time resources.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention pertains to a technique for improving a system capacity gain without additional time resources in a wireless communication system supporting relaying. The following description is made under the assumption that Mobile Stations (MSs) are immune to interference through independent resources distribution.

While the present invention will be described in the context of a Time Division Duplexing-Orthogonal Frequency Division Multiple Access (TDD-OFDMA) wireless communication system, the same description applies to other multiple access wireless communication systems. Due to TDD, the downlink and the uplink have the same channel information in the wireless communication system.

Figure 1:
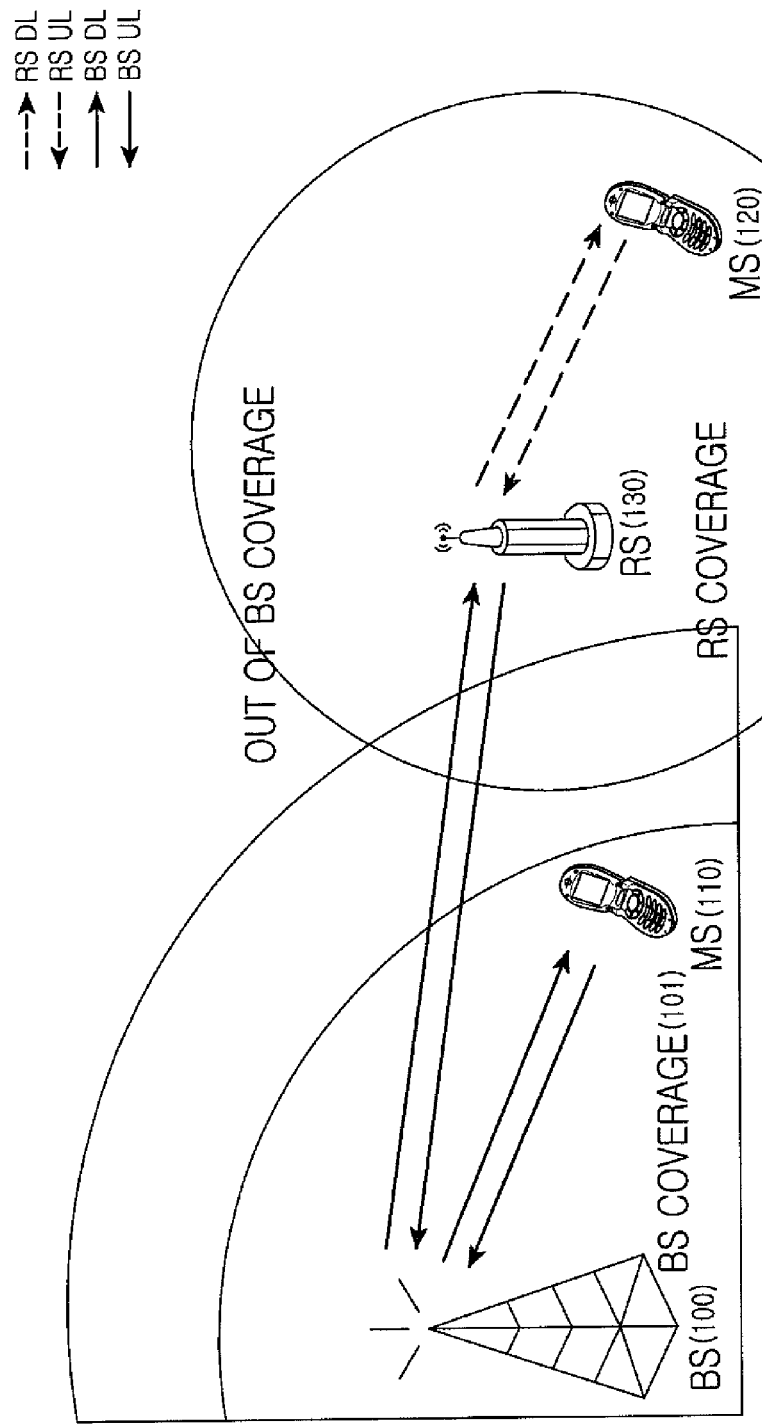
FIG. 1 illustrates the configuration of a conventional wireless communication system supporting relaying.
Figure 2:
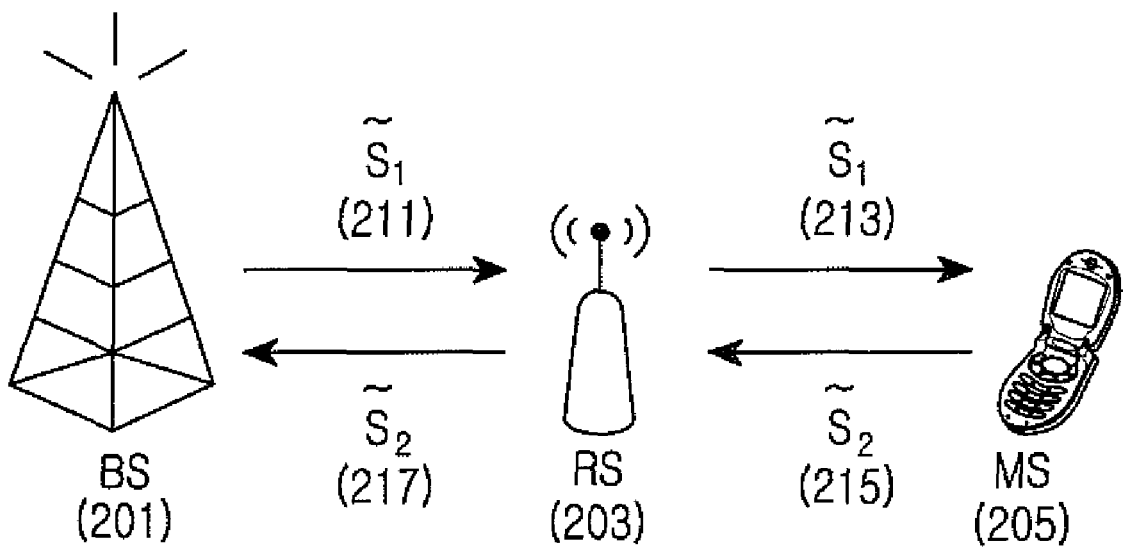
FIG. 2 illustrates the configuration of a conventional wireless communication system supporting TDD relaying.
Figure 3:
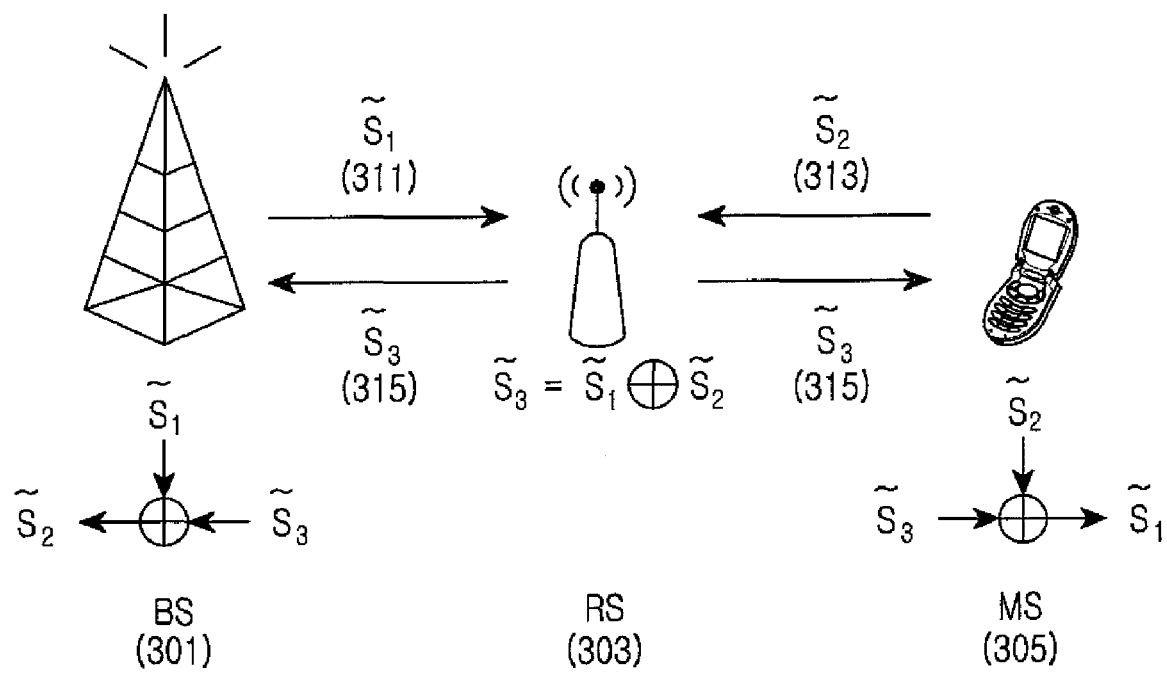
FIG. 3 illustrates the configuration of a conventional wireless communication system supporting coded bi-directional relaying.
Figure 4:
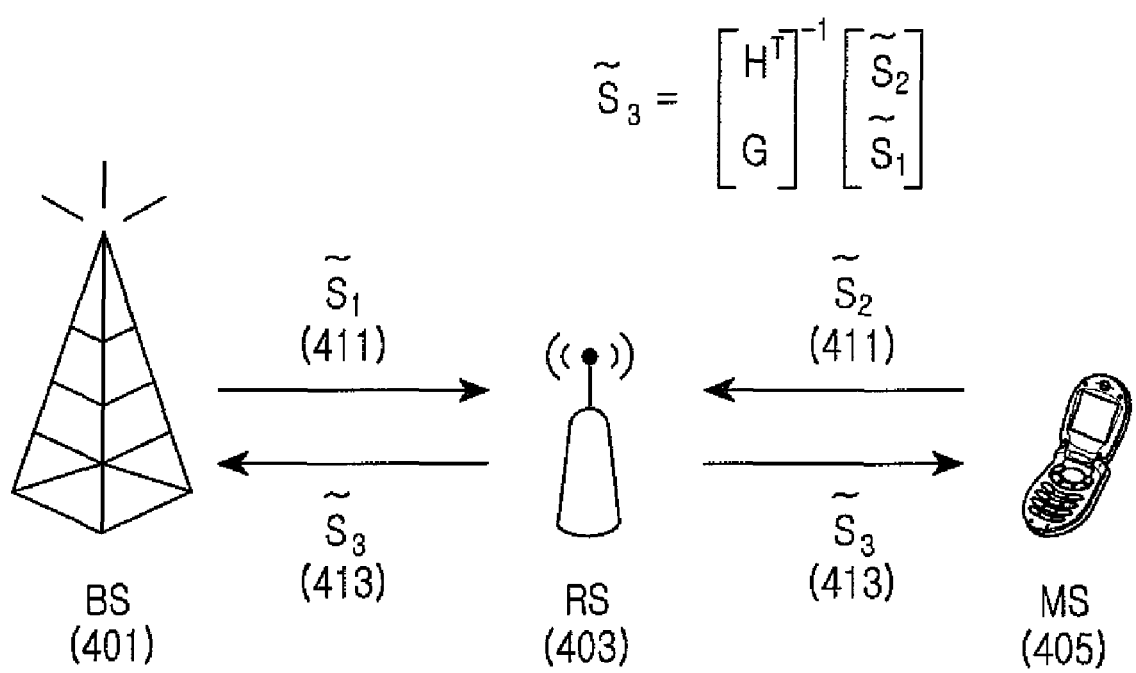
FIG. 4 illustrates the configuration of a conventional wireless communication system supporting multi-user SDMA relaying.
Figure 5:
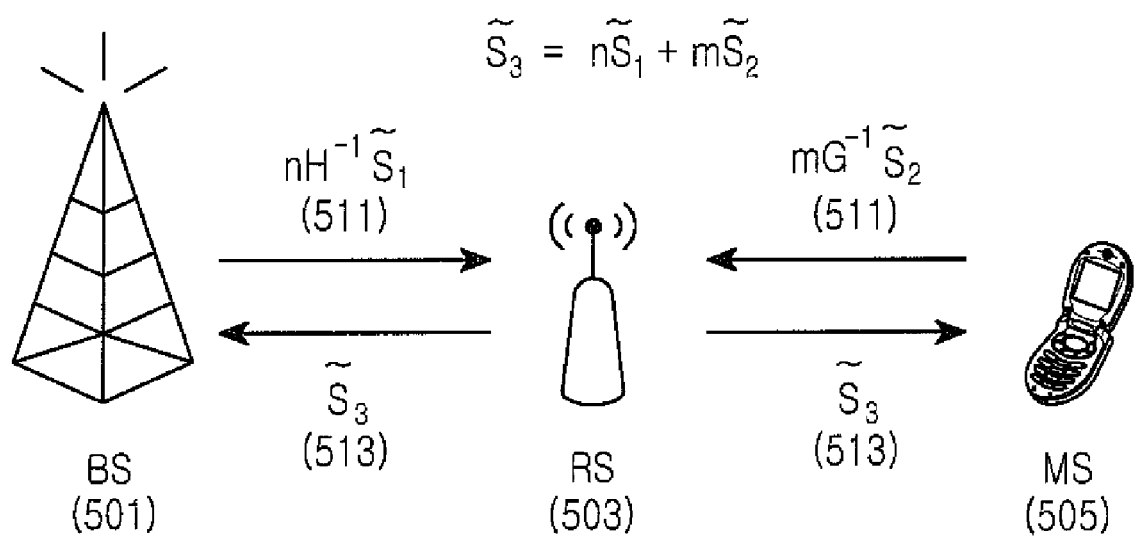
FIG. 5 illustrates the configuration of a wireless communication system supporting relaying according to an exemplary embodiment of the present invention.

As illustrated in FIG. 5, an exemplary wireless communication system supports relaying.

FIG. 5 illustrates a configuration of a wireless communication system supporting relaying according to an exemplary embodiment of the present invention.

Referring to FIG. 5, a wireless communication system supports relaying using two time resources. For example, a Base Station (BS) 501 and a Mobile Station (MS) 505 transmit pre-coded signals to an RS 503 in first time resources in step 511. The pre-coded signals are given in equation (1) as $$X_{BS} = nH^{-1}\tilde{S}_1$$
$$X_{MS} = mG^{-1}\tilde{S}_2 \quad (1)$$

where $X_{BS}$ denotes the pre-coded signal transmitted from the BS 501 to the RS 503, $X_{MS}$ denotes the pre-coded signal transmitted from the MS 505 to the RS 503, $\tilde{S}_1$ denotes a transmission signal from the BS 501, $\tilde{S}_2$ denotes a transmission signal from the MS 505, n and m respectively denote the power control constants of the transmission signals $\tilde{S}_1$ and $\tilde{S}_2$, H denotes channel information about a BS-RS link, and G denotes channel information about an RS-MS link.

As noted from equation (1), the BS 501 multiplies the transmission signal $\tilde{S}_1$ by the reciprocal of the channel information H of the BS-RS link, prior to transmission, and the MS 505 also multiplies the transmission signal $\tilde{S}_2$ by the reciprocal of the channel information G of the RS-MS link, prior to transmission.

The RS 503 receives the sum of the signals transmitted from the BS 501 and the MS 505 and detects it ($\tilde{S}_3 = n\tilde{S}_1 + m\tilde{S}_2$). For instance, the sum of the transmitted signals is expressed by equation (2) as $$y_{RS} = n\tilde{S}_1 + m\tilde{S}_2 + n_{RS} \quad (2)$$

where $y_{RS}$ denotes the sum of the transmitted signals from the BS 501 and the MS 505, received at the RS 503, $\tilde{S}_1$ denotes the transmission signal of the BS 501, $\tilde{S}_2$ denotes the transmission signal of the MS 505, n and m respectively denote the power control constants of the signals $\tilde{S}_1$ and $\tilde{S}_2$, and $n_{RS}$ denotes the thermal noise of the RS 503.

The RS 503 performs signal detection by eliminating the noise from the received signal given as equation (2). For example, the RS 503 detects the received signal by eliminating the noise through symbol constellation extension as expressed in equation (3)

$$\hat{y}_{RS} \approx n\tilde{S}_1 + m\tilde{S}_2 \quad (3)$$

where $\hat{y}_{RS}$ denotes the received signal from which the noise is eliminated, $\tilde{S}_1$ denotes the transmission signal of the BS 501, $\tilde{S}_2$ denotes the transmission signal of the MS 505, and n and m respectively denote the power control constants of the signals $\tilde{S}_1$ and $\tilde{S}_2$.

In step 513, if the RS 503 uses an Amplify and Forward (AF) strategy, it amplifies the power of the detected signal expressed as equation (3) and transmits the amplified signal $\tilde{S}_3$ to the BS 501 and the MS 505 in second time resources.

Alternatively in step 513, if the RS 503 uses a Decode and Forward (DF) strategy, it corrects errors in the detected signal by decoding and transmits the decoded signal $\tilde{S}_3$ to the BS 501 and the MS 505 in second time resources.

The signal received from the RS 503 in the BS 501 is shown by equation (4)

$$y_{BS} = H^T \tilde{X}_{RS} + n_{BS} \quad (4)$$

where $y_{BS}$ denotes the signal received from the RS 503, H denotes the channel information of the BS-RS link, $\tilde{X}_{RS}$ denotes the signal transmitted by the RS 503, expressed as equation (3), and $n_{BS}$ denotes the thermal noise of the BS 501.

With knowledge of the signal $\tilde{S}_1$ transmitted to the RS 503 in the first time resources, the BS 501 can detect the signal $\tilde{S}_2$ transmitted by the MS 505 using equation (5)

$$r_{BS} = y_{BS} - H^T n\tilde{S}_1 = mH^T \tilde{S}_2 + n_{BS} \quad (5)$$

where $r_{BS}$ denotes the signal transmitted by the MS 505, $y_{BS}$ denotes the signal that the BS 501 has received from the RS 503, H denotes the channel information of the BS-RS link, $\tilde{S}_1$ denotes the signal that the BS 501 transmitted to the RS 503 in the first time resources, $\tilde{S}_1$ denotes the signal that the MS 505 transmitted to the RS 503 in the first time resources, and $n_{BS}$ denotes the thermal noise of the BS 501.

The BS 501 has knowledge of the channel information of the BS-RS link and the signal transmitted to the RS 503 in the first time resources. Therefore, the BS 501 can detect and decode the signal transmitted by the MS 505 by eliminating the signal transmitted to the RS 503 from the received signal described as equation (4) according to equation (5).

Meanwhile, the signal received from the RS 503 in the MS 505 is as shown in equation (6)

$$y_{MS} = G^T \tilde{X}_{RS} + n_{MS} \quad (6)$$

where $y_{MS}$ denotes the signal received from the RS 503, G denotes the channel information of the RS-MS link, $\tilde{X}_{RS}$ denotes the signal transmitted by the RS 503, expressed as equation (3), and $n_{MS}$ denotes the thermal noise of the MS 505.

With knowledge of the signal $\tilde{S}_2$ transmitted to the RS 503 in the first time resources, the MS 505 can detect the signal $\tilde{S}_1$ transmitted by the BS 501 using equation (7)

$$r_{MS} = y_{MS} - G^T m\tilde{S}_2 = nG^T \tilde{S}_1 + n_{MS} \quad (7)$$

where $r_{MS}$ denotes the signal transmitted by the BS 501, $y_{MS}$ denotes the signal received from the RS 503, G denotes the channel information of the RS-MS link, $\tilde{S}_1$ denotes the signal that the BS 501 transmitted to the RS 503 in the first time resources, $\tilde{S}_2$ denotes the signal that the MS 505 transmitted to the RS 503, and $n_{MS}$ denotes the thermal noise of the MS 505.

The MS 505 has knowledge of the channel information of the RS-MS link and the signal transmitted to the RS 503 in the first time resources. Therefore, the MS 505 can detect and decode the signal transmitted by the BS 501 by eliminating the signal transmitted to the RS 503 from the received signal described as equation (6) according to equation (7).

Figure 6:
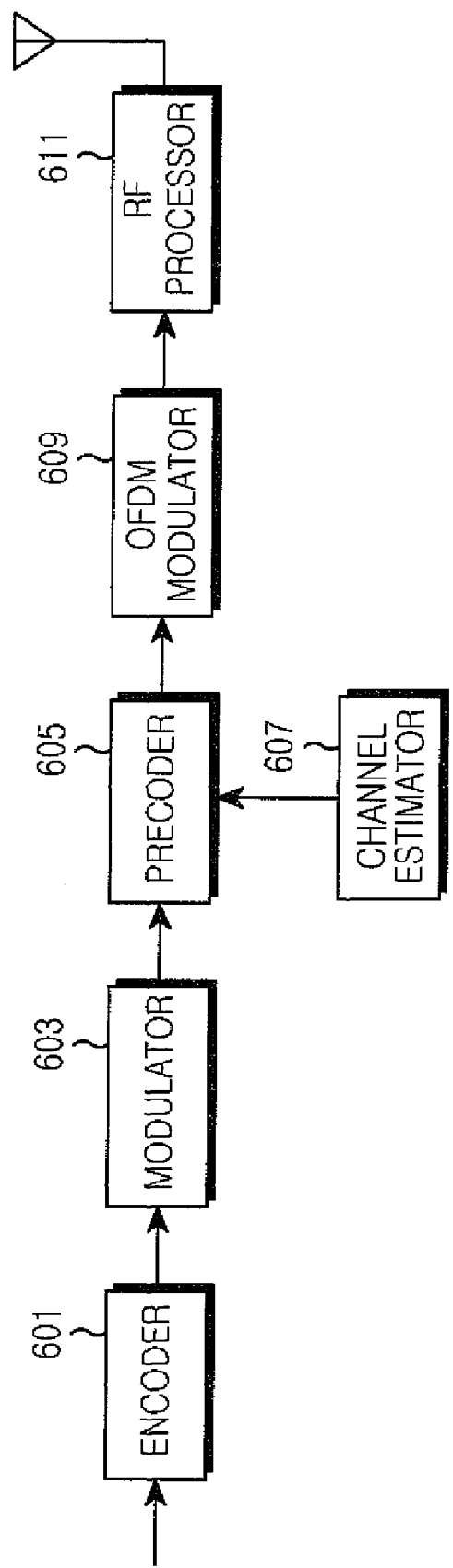
FIG. 6 is a block diagram of a BS transmitter in a wireless communication system supporting relaying according to an exemplary embodiment of the present invention.

FIG. 6 is a block diagram of a BS transmitter in a wireless communication system supporting relaying according to an exemplary embodiment of the present invention.

Referring to FIG. 6, the BS transmitter includes an encoder 601, a modulator 603, a precoder 605, a channel estimator 607, an OFDM modulator 609, and an RF processor 611.

The encoder 601 encodes a signal to be transmitted to the MS via the RS using a coding rate. The modulator 603 modulates the coded signal using a modulation scheme. The modulation scheme may be identical to a modulation scheme in which the MS transmits a signal to the RS.

The precoder 605 pre-encodes the modulated signal using channel information about the BS-RS link received from the channel estimator 607 according to equation (1).

The channel estimator 607 estimates the channel of the BS-RS link using a signal received from the RS and provides the estimated channel information to the precoder 605.

The OFDM modulator 609 converts the pre-coded frequency signal received from the precoder 605 to a time signal by Inverse Fast Fourier Transform (IFFT).

The RF processor 611 upconverts the baseband time signal received from the OFDM modulator 609 to an RF signal and transmits the RF signal to the RS through an antenna.

Although not illustrated, an exemplary MS transmitter may be configured substantially similar to the BS transmitter illustrated in FIG. 6. That is, the blocks of an MS transmitter, except for a precoder and a channel estimator, operate in substantially the same manner as their counterparts illustrated in FIG. 6. However, in an MS transmitter, the channel estimator estimates the channel of the RS-MS link using a signal received from the RS. Also, the precoder of an MS transmitter pre-codes a transmission signal based on the channel information of the RS-MS link received from the channel estimator.

Figure 7:
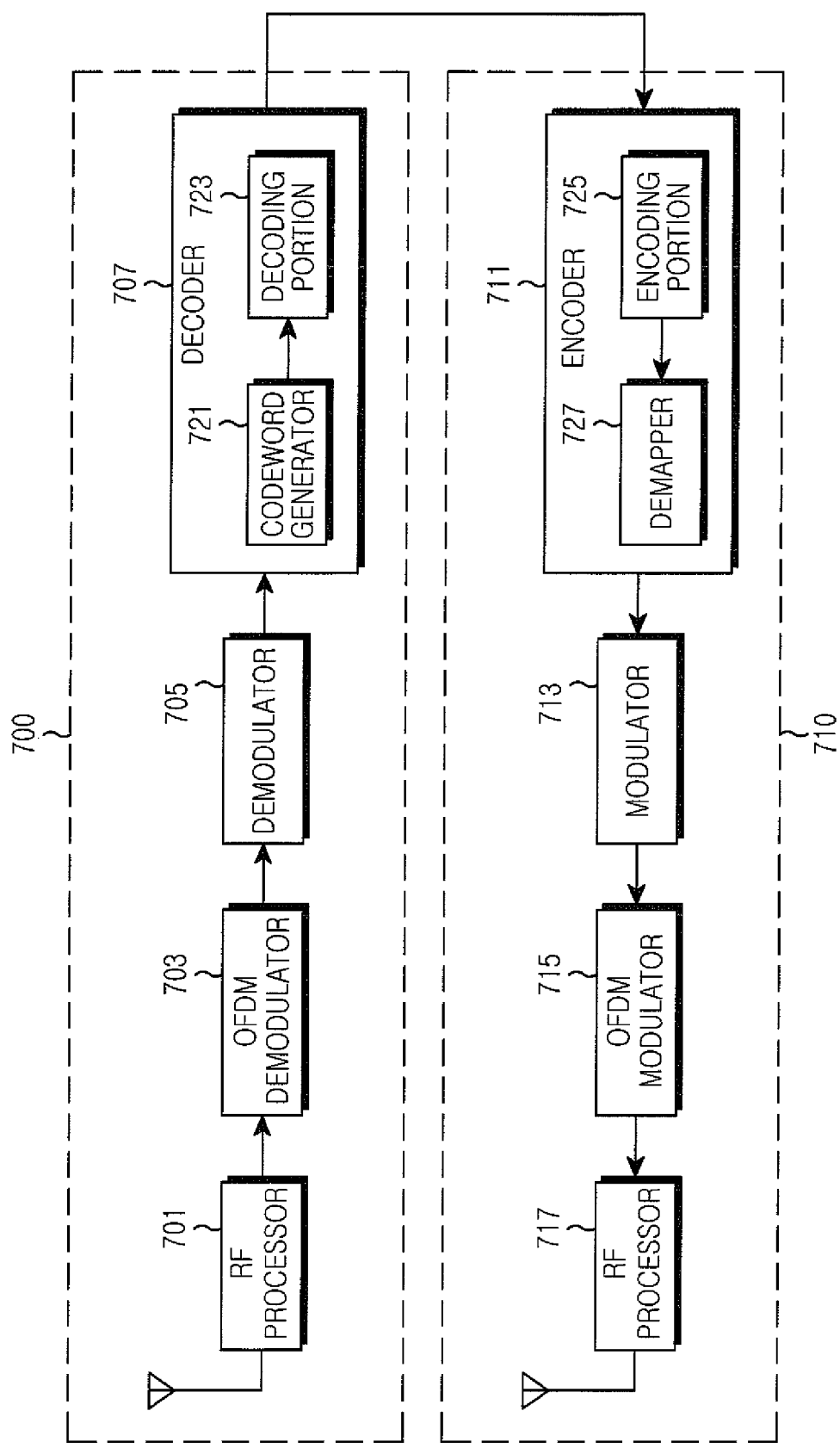
FIG. 7 is a block diagram of an RS in a wireless communication system supporting relaying according to an exemplary embodiment of the present invention.

FIG. 7 is a block diagram of an RS in a wireless communication system supporting relaying according to an exemplary embodiment of the present invention. The RS uses a DF strategy, by way of example only.

Referring to FIG. 7, an RS includes a receiver 700 and a transmitter 710.

The receiver 700 is comprised of an RF processor 701, an OFDM demodulator 703, a demodulator 705, and a decoder 707.

The RF processor 701 downconverts an RF signal, for example an RF signal received from a BS or an MS, through an antenna to a baseband signal.

The OFDM demodulator 703 converts the time signal received from the RF processor 701 to a frequency signal by Fast Fourier Transform (FFT).

The demodulator 705 demodulates the frequency signal using a modulation scheme. In the received signal expressed as equation (2), which includes the transmission signals of the BS and the MS, signals $\tilde{S}_1$ and $\tilde{S}_2$ each have elements $-1$s or $1$s. Thus, the demodulator 705 converts the signals $\tilde{S}_1$ and $\tilde{S}_2$ to signals each having elements $0$s or $1$s, $\tilde{X}_1$ and $\tilde{X}_2$ by scaling and shifting as illustrated in equation (8)

$$y_{RS} \approx n\tilde{S}_1 + m\tilde{S}_2 = n(-2\tilde{X}_1 + 1) + m(-2\tilde{X}_2 + 1) \Rightarrow \quad (8)$$

$$r = n\tilde{X}_1 + m\tilde{X}_2$$

$$= -\frac{y + (n+m)}{2}$$

where $y_{RS}$ denotes the signal received from the BS and the MS, $\tilde{S}_1$ denotes the transmission signal of the BS, $\tilde{S}_2$ denotes the transmission signal of the MS, n and m denote the power control constants of the signals $\tilde{S}_1$ and $\tilde{S}_2$, and $\tilde{X}_1$ and $\tilde{X}_2$ denote the converted versions of $\tilde{S}_1$ and $\tilde{S}_2$.

The decoder 707 decodes the demodulated signal received from the demodulator 705 using a coding rate, thus recovering the sum of the transmission signals of the BS and the MS. $\tilde{X}_1$ and $\tilde{X}_2$ of the signal r received from the demodulator 705 are linear codewords, but the signal r is the sum of the product of $\tilde{X}_1$ and one of $\{0, n, m, n+m\}$ and the product of $\tilde{X}_2$ and one of $\{0, n, m, n+m\}$. Therefore, r cannot be a codeword used for generating $\tilde{X}_1$ and $\tilde{X}_2$ in the BS and the MS. That is, the decoder 707 cannot decode the signal r. Thus, the decoder 707 converts the signal r received from the demodulator 705 to a codeword by use of a codeword generator 721.

Figure 12A:
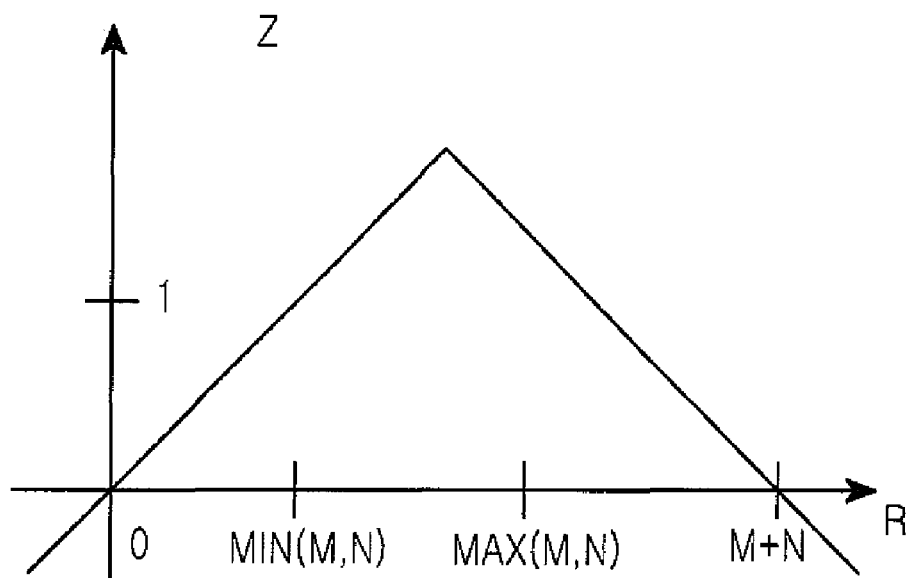
FIGS. 12A and 12B are mapping graphs in a wireless communication system supporting relaying according to exemplary embodiments of the present invention.
Figure 12B:
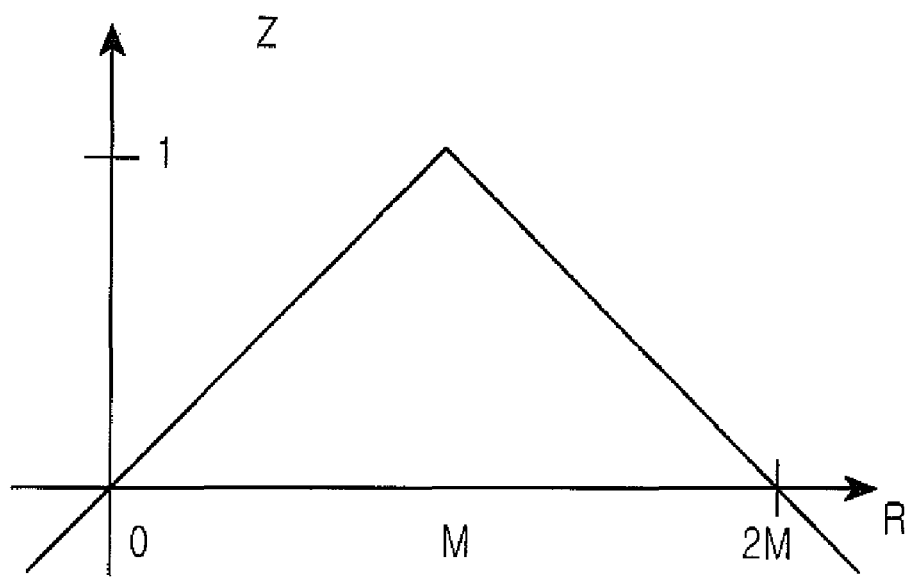

The codeword generator 721 converts the signal r received from the demodulator 705 to 0s and 1s of a continuous function, as illustrated in FIGS. 12A and 12B.

FIGS. 12A and 12B are mapping graphs in a wireless communication system supporting relaying according to exemplary embodiments of the present invention.

When the power control constants of the BS and the MS, n and m, are different, the codeword generator 721 maps the signal r to a codeword with 0s or 1s by a linear function as illustrated in FIG. 12A.

If the power control constants of the BS and the MS, n and m, are equal, the codeword generator 721 maps the signal r to a codeword with 0s or 1s by a linear function as illustrated in FIG. 12B.

It can be further contemplated as another exemplary embodiment of the present invention that the codeword generator 721 converts the signal r to a codeword by using equation (9)

$$Z = \mathrm{mod}_2(\tilde{X}_1 + \tilde{X}_2) = XOR(\tilde{X}_1, \tilde{X}_2) \quad (9)$$

where $\tilde{X}_1$ and $\tilde{X}_2$ denote the linear codewords for $\tilde{S}_1$ and $\tilde{S}_2$.

According to equation (9), the codeword generator 721 converts the signal r to a codeword by modulo-operating the combination of $\tilde{X}_1$ and $\tilde{X}_2$ being linear codewords. The modulo-operation of the combination of $\tilde{X}_1$ and $\tilde{X}_2$ is equivalent to XOR-operation of $\tilde{X}_1$ and $\tilde{X}_2$.

After the decoder 707 converts the signal r to a codeword, a decoding portion 723 of the decoder 707 decodes the codeword received from the codeword generator 721, thus correcting errors. Here, the decoder 723 considers that it receives $XOR(\tilde{X}_1, \tilde{X}_2)$ rather than $n\tilde{X}_1 + m\tilde{X}_2$. As illustrated in equation (10), because $n\tilde{X}_1 + m\tilde{X}_2$ and $XOR(\tilde{X}_1, \tilde{X}_2)$ should have the same soft-decision value (i.e. Log Likelihood Ratio (LLR), $$\ln\frac{P(z_i = 1 \mid r)}{P(z_i = 0 \mid r)} = \ln\frac{P\{(x_1^i, x_2^i = 1, 0) \text{ or } (x_1^i, x_2^i = 0, 1) \mid r\}}{P\{(x_1^i, x_2^i = 1, 1) \text{ or } (x_1^i, x_2^i = 0, 0) \mid r\}} \quad (10)$$

$$= \ln\frac{Ke^{-(r_i-m)^2/N_0} + Ke^{-(r_i-n)^2/N_0}}{Ke^{-(r_i-0)^2/N_0} + Ke^{-(r_i-m-n)^2/N_0}}$$

$$z_i = \frac{N_o}{2}\ln\frac{e^{-(r_i-m)^2/N_0} + e^{-(r_i-n)^2/N_0}}{e^{-(r_i-0)^2/N_0} + e^{-(r_i-m-n)^2/N_0}} + \frac{1}{2}$$

where n and m denote the power control constants of the signals $\tilde{S}_1$ and $\tilde{S}_2$ and $\tilde{X}_1$ and $\tilde{X}_2$ denote the converted versions of $\tilde{S}_1$ and $\tilde{S}_2$.

Since the probability of z being 1 should be equal to the probability of n or m being 1, equation (10) is substantiated. Equation (10) is an optimal solution for achieving z in the codeword generator 721. The simple linear mapping graphs of FIGS. 12A and 12B can be drawn based on equation (10).

The transmitter 710 includes an encoder 711, a modulator 713, an OFDM modulator 715, and an RF processor 717.

The encoder 711 encodes the signal decoded by the decoder 707 of the receiver 700 using a coding rate. Specifically, an encoding portion 725 of the encoder 711 encodes the decoded signal that is not the decoded version of the signal r provided from the demodulator 705 to the decoder 707 but the decoded version of the codeword z generated from the codeword generator 721 of the decoder 707.

Hence, a demapper 727 of the encoder 711 reconstructs the coded signal received from the encoding portion 725 to a signal before the codeword generation of the codeword generator 721. The reconstructed signal is a signal resulting from correcting errors in the signal r.

The demapper 727 reconstructs the signal before the codeword generation in the codeword generator 721 according to equation (11) using the method illustrated in FIGS. 12A and 12B:

$$i)\ m \neq n$$

$$\text{if } \tilde{z} = 0, \qquad\qquad \text{if } \tilde{z} = 1,$$

$$\hat{r} = \begin{cases} 0 & |r-0| \leq |r-(m+n)| \\ m+n & |r-0| > |r-(m+n)| \end{cases} \quad \hat{r} = \begin{cases} \min\{m,n\} & |r-\min\{m,n\}| \leq |r-\max\{m,n\}| \\ \max\{m,n\} & |r-\min\{m,n\}| > |r-\max\{m,n\}| \end{cases}$$

$$ii)\ m = n$$

$$\text{if } \tilde{z} = 0, \qquad\qquad \text{if } \tilde{z} = 1,$$

$$\hat{r} = \begin{cases} 0 & |r-0| \leq |r-2m| \\ 2m & |r-0| > |r-2m| \end{cases} \qquad \hat{r} = m$$

(11)

where $\tilde{z}$ denotes the signal encoded by the encoding portion 725 and n and m respectively denote the power control constants of the transmission signals of the BS and the MS.

According to equation (11), if n and m are different, the demapper 727 maps $\tilde{z}$ to 0 or n+m depending on the value of r, when $\tilde{z}$ is 0. When $\tilde{z}$ is 1, the demapper 727 maps $\tilde{z}$ to min {m,n} or max {m,n} depending on the value of r.

If n and m are equal, the demapper 727 maps $\tilde{z}$ to 0 or 2m depending on the value of r, when $\tilde{z}$ is 0. When $\tilde{z}$ is 1, the demapper 727 maps $\tilde{z}$ to m.

The modulator 713 modulates the coded signal received from the encoder 711 using a modulation scheme.

The OFDM modulator 715 converts the frequency signal received from the modulator 713 to a time signal by IFFT.

The RF processor 717 upconverts the baseband signal received from the OFDM modulator 715 to an RF signal and transmits the RF signal to the BS and the MS through an antenna.

The transmitted signal is given as equation (12)

$$\tilde{X}_{RS} = -2\hat{r} + n + m \approx -2n\tilde{X}_1 + n - 2m\tilde{X}_2 + m \qquad (12)$$
$$= n\tilde{S}_1 + m\tilde{S}_2$$

where $\tilde{X}_{RS}$ denotes the transmitted signal, $\hat{r}$ denotes the coded signal from the encoder 711, $\tilde{S}_1$ denotes the modulated signal transmitted by the BS, $\tilde{S}_2$ denotes the modulated signal transmitted by the MS, n and m respectively denote the power control constants of the signals transmitted by the BS and the MS, and $\tilde{X}_1$ and $\tilde{X}_2$ denote the demodulated signals, i.e. codewords of $\tilde{S}_1$ and $\tilde{S}_2$.

Figure 8:
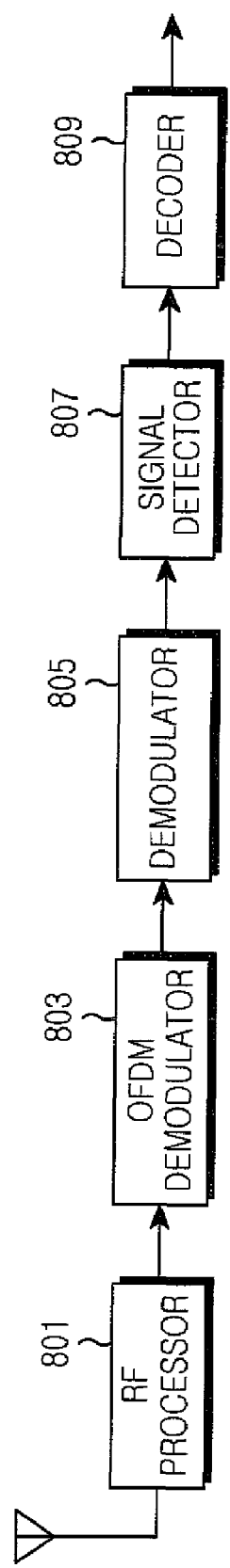
FIG. 8 is a block diagram of a BS receiver in a wireless communication system supporting relaying according to an exemplary embodiment of the present invention.

FIG. 8 is a block diagram of a BS receiver in a wireless communication system supporting relaying according to an exemplary embodiment of the present invention.

Referring to FIG. 8, a BS receiver includes an RF processor 801, an OFDM demodulator 803, a demodulator 805, a signal detector 807, and a decoder 809.

The RF processor 801 downconverts an RF signal received through an antenna to a baseband signal. The received signal is given as equation (4).

The OFDM demodulator 803 converts the time signal received from the RF processor 801 to a frequency signal by FFT.

The demodulator 805 demodulates the frequency signal in accordance with a modulation scheme.

The signal detector 807, which has knowledge of a signal transmitted to the RS, eliminates the transmitted signal from the demodulated signal according to equation (5).

The decoder 809 decodes the signal received from the signal detector 807, thereby recovering the signal transmitted by the MS.

Although not illustrated, an exemplary MS receiver may be configured substantially similar to the BS transmitter illustrated in FIG. 8. That is, the blocks of an MS receiver, except for a demodulator, operate in substantially the same manner as their counterparts of the BS receiver illustrated in FIG. 8. However, an MS receiver has knowledge of a signal transmitted to the RS and thus the demodulator of the MS receiver can recover the signal transmitted by the BS by eliminating the signal transmitted to the RS from a signal received from the RS.

Now a description will be made of exemplary operations of a BS, an RS and an MS for signal relaying in a wireless communication system.

Figure 9:
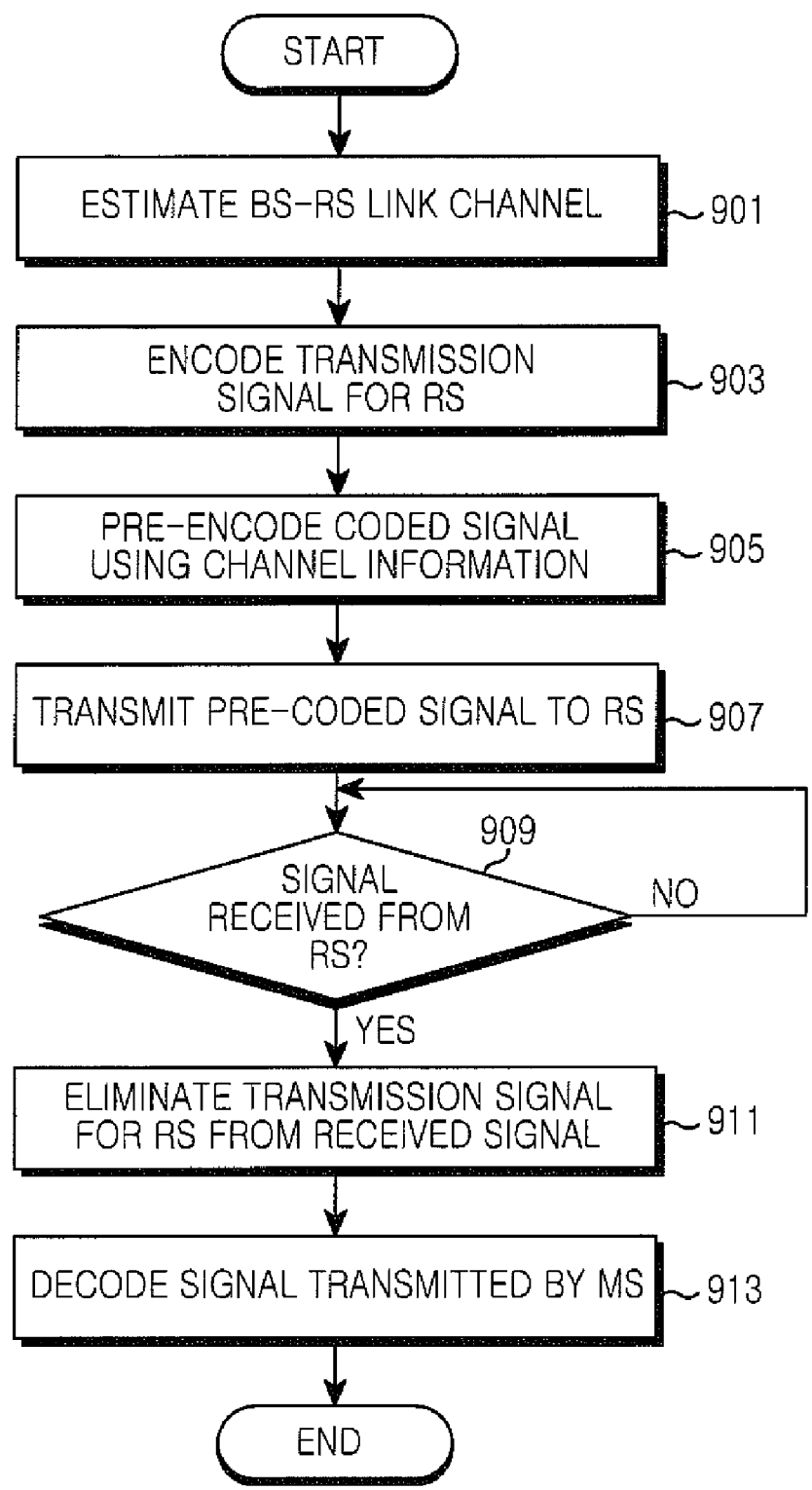
FIG. 9 is a flowchart of an operation of a BS in a wireless communication system supporting relaying according to an exemplary embodiment of the present invention.

FIG. 9 is a flowchart of an operation of a BS in a wireless communication system supporting relaying according to an exemplary embodiment of the present invention.

Referring to FIG. 9, a BS estimates a channel on a BS-RS link in step 901. For example, the BS estimates the BS-RS link channel using an uplink signal received from the RS. It can be further contemplated as another exemplary embodiment of the present invention that the BS acquires channel information about the BS-RS link from a feedback signal received from the RS.

In step 903, the BS encodes and modulates a signal to be transmitted to the MS via the RS using a Modulation and Coding Scheme (MCS) level.

The BS pre-encodes the modulated signal using the BS-RS link channel information in step 905. To be more specific, the BS multiplies the modulated transmission signal by the reciprocal of the BS-RS link channel information according to equation (1). The BS transmits the pre-coded signal to the RS in step 907.

In step 909, the BS monitors reception of a signal from the RS. Upon receipt of the signal from the RS, the BS eliminates the signal transmitted to the RS from the received signal in step 911. For instance, the BS receives a signal expressed as equation (4) from the RS and eliminates the signal $\tilde{S}_1$ transmitted to the RS from the received signal by equation (5).

In step 913, the BS decodes the resulting signal, thus recovering a signal transmitted by the MS via the RS.

Then, the BS ends the algorithm.

Figure 10:
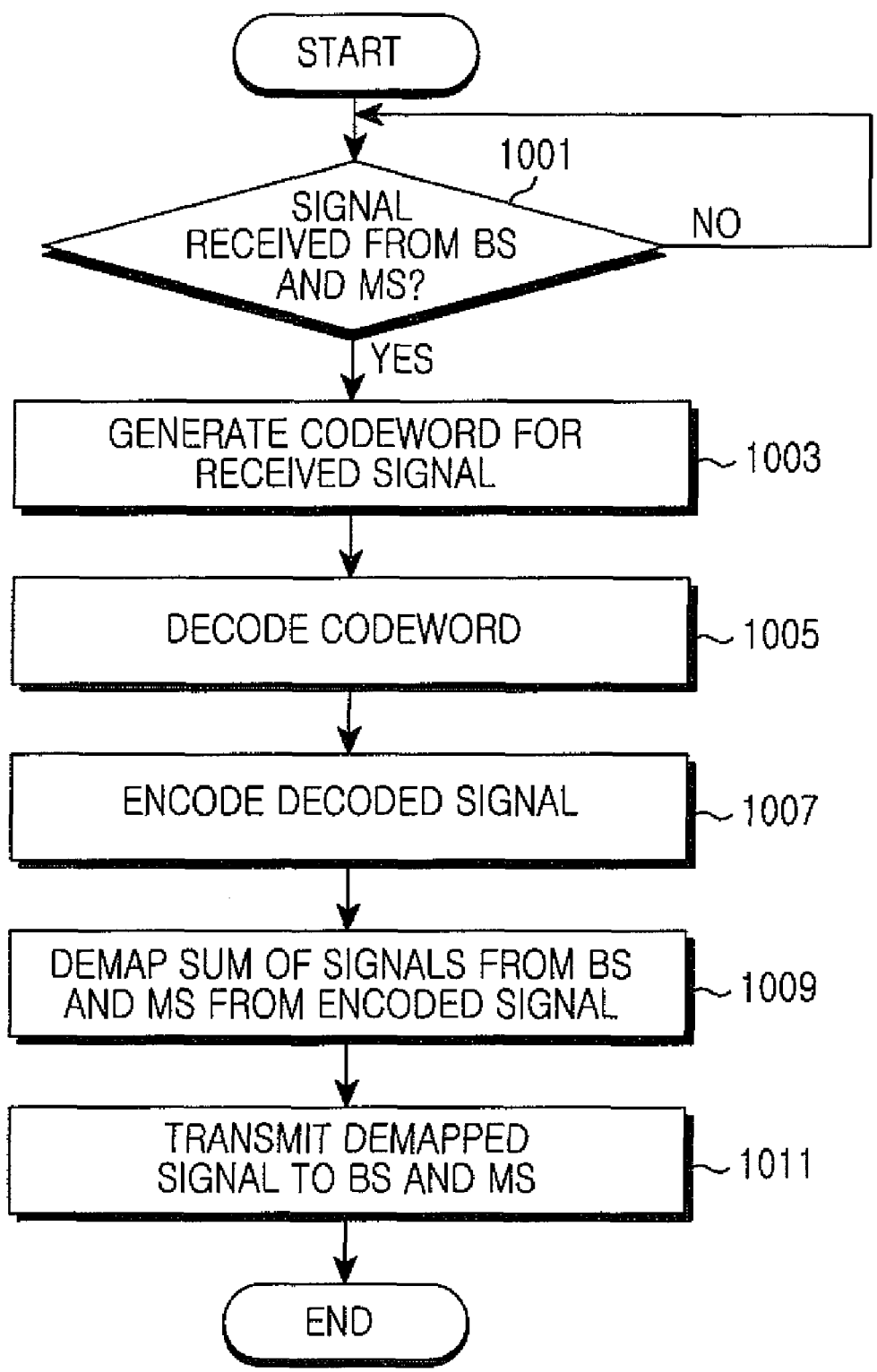
FIG. 10 is a flowchart of an operation of an RS in a wireless communication system supporting relaying according to an exemplary embodiment of the present invention.

FIG. 10 is a flowchart of an operation of an RS in a wireless communication system supporting relaying according to an exemplary embodiment of the present invention.

Referring to FIG. 10, an RS monitors reception of signals from the BS and the MS in step 1001.

Upon receipt of the signals from the BS and the MS, the RS generates a codeword z by performing an XOR operation on the signal $\tilde{S}_1$ received from the BS and the signal $\tilde{S}_2$ received from the MS in step 1003. For example, the RS generates the codeword by mapping the XOR-operation value in a mapping table as illustrated in FIGS. 12A and 12B, or by modular operation or XOR-operation of $\tilde{S}_1$ and $\tilde{S}_2$ described as equation (9).

In step 1005, the RS corrects errors in the codeword by decoding.

The RS encodes the decoded signal at a coding rate in step 1007. The RS demaps the sum of the signals received from the BS and the MS from the coded signal in step 1009. That is, the coded signal is not a signal resulting from correcting errors in the signal $\tilde{S}_3$ and then encoding the error-corrected signal, but a signal resulting from correcting errors in the codeword z of the signal $\tilde{S}_3$ and then encoding the error-corrected signal. Therefore, the RS recovers the signal $\tilde{S}_3$ by demapping the coded signal. The recovered signal $\tilde{S}_3$ is an error-corrected signal.

In step 1011, the RS transmits the signal $\tilde{S}_3$ to the BS and the MS. For example, the RS transmits a signal expressed as equation (12) to the BS and the MS.

Then, the RS ends the algorithm.

Figure 11:
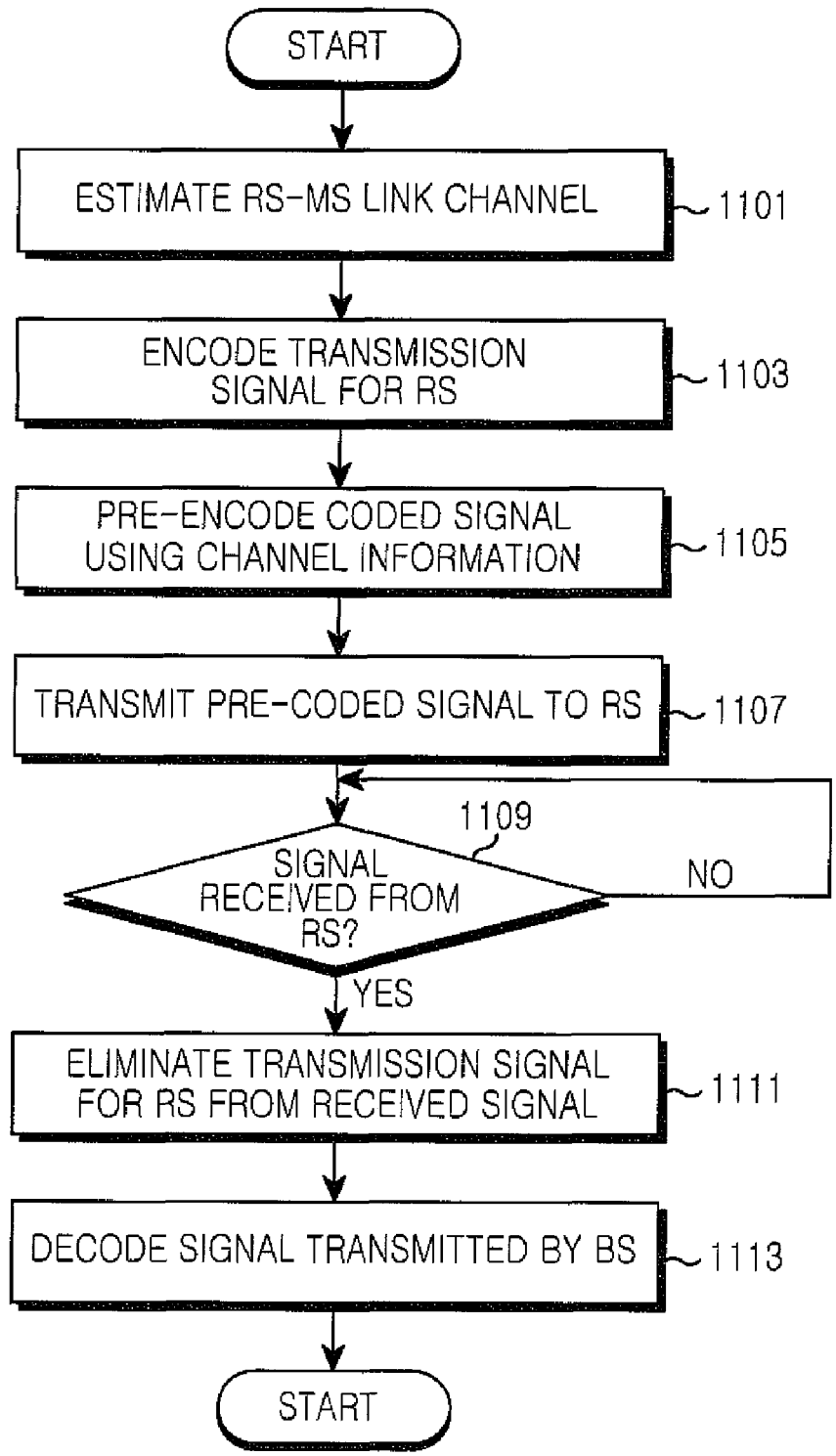
FIG. 11 is a flowchart of an operation of an MS in a wireless communication system supporting relaying according to an exemplary embodiment of the present invention.

FIG. 11 is a flowchart of an operation of an MS in the wireless communication system supporting relaying according to an exemplary embodiment of the present invention.

Referring to FIG. 11, an MS estimates a channel on an RS-MS link in step 1101. For example, the MS estimates the RS-MS link channel using a downlink signal received from the RS.

In step 1103, the MS encodes and modulates a signal to be transmitted to the BS via the RS at an MCS level.

The MS pre-encodes the modulated signal using the RS-MS link channel information in step 1105. To be more specific, the MS multiplies the modulated transmission signal by the reciprocal of the RS-MS link channel information according to equation (1). The MS transmits the pre-coded signal to the RS in step 1107.

In step 1109, the MS monitors reception of a signal from the RS. Upon receipt of the signal from the RS, the MS eliminates the signal transmitted to the RS from the received signal in step 1111. For instance, the MS receives a signal expressed as equation (6) from the RS and eliminates the signal transmitted to the RS from the received signal by equation (7).

In step 1113, the MS decodes the resulting signal, thus recovering a signal transmitted by the BS via the RS.

Then, the MS ends the algorithm.

In the above-described exemplary embodiment of the present invention, the RS recovers a codeword generated for decoding the sum of signals transmitted from the BS and the MS and transmits the sum of the signals to the BS and the MS. As another exemplary embodiment of the present invention, the RS may transmit the codeword to the BS and the RS without recovering it to the sum of the transmission signals of the BS and the MS. The BS recovers the signal transmitted by the MS by XOR-operating the received signal and the signal transmitted to the RS, and the MS recovers the signal transmitted by the BS by XOR-operating the received signal and the signal transmitted to the RS.

A description will be made of performance change when signals are relayed in the manner illustrated in FIG. 5.

Figure 13:
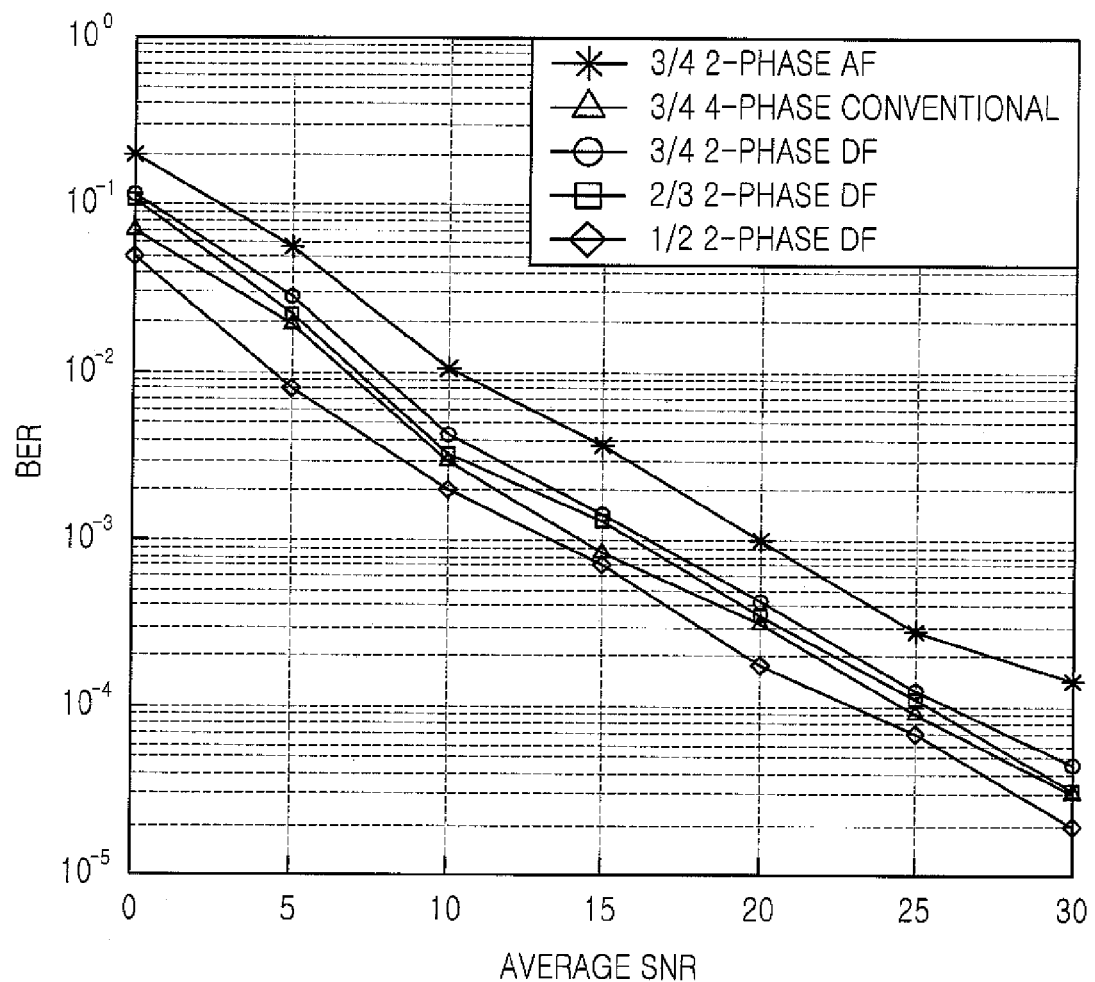
FIG. 13 is a performance change graph according to an exemplary embodiment of the present invention.

FIG. 13 is a performance change graph according to an exemplary embodiment of the present invention. The horizontal axis represents average Signal-to-Noise Ratio (SNR) and the vertical axis represents Bit Error Rate (BER).

Referring to FIG. 13, the conventional technology supporting relaying using four independent time resources is compared with the present invention supporting relaying using two independent time resources. Another line indicates a performance graph of AF relaying.

As noted from FIG. 13, given the same coding rate, the conventional technology outperforms the present invention in BER. Nonetheless, the present invention offers twice the capacity gain using half the time resources, compared to the conventional technology.

For a coding rate of ⅔, exemplary embodiments of the present invention have a capacity gain of $$77.78\% \left( \frac{(2/3 \times 2) - 3/4}{3/4} \times 100 \right),$$

despite the BER increase. For a coding rate of ½, exemplary embodiments of the present invention have a capacity gain of $$33.33\% \left( \frac{(1/2 \times 2) - 3/4}{3/4} \times 100 \right),$$

despite the BER increase.

As is apparent from the above description, exemplary embodiments of the present invention advantageously increase an overall system capacity gain by multiplying a transmission signal by the reciprocal function of BS-RS link channel information or RS-MS link channel information in a BS and an MS, for relaying using two independent time resources in a multi-hop relay wireless communication system.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for supporting Decode and Forward (DF) relaying in a Relay Station (RS) in a wireless communication system, the method comprising:
   monitoring reception of signals from a first transmitting apparatus and a second transmitting apparatus in the same time resources; and
   transmitting, upon receipt of the signals from the first transmitting apparatus and the second transmitting apparatus, the sum of the received signals to the first transmitting apparatus and the second transmitting apparatus in the same time resources,
   wherein the transmitting comprises:
   demodulating the sum of the received signals using a modulation scheme;
   converting the demodulated signal to a codeword;
   decoding the codeword using a coding rate;

encoding the decoded signal using at least one of the coding rate and a different coding rate; and transmitting the coded signal to the first transmitting apparatus and the second transmitting apparatus, and wherein the decoding and encoding comprise channel information of a link between the RS and at least one of the first transmitting apparatus and the second transmitting apparatus.

2. The method of claim 1, wherein the transmitting comprises:

eliminating noise included in the sum of the received signals;

amplifying the noise-free signal; and transmitting the amplified signal to the first transmitting apparatus and the second transmitting apparatus.

3. The method of claim 1, wherein the converting to a codeword comprises modulo-operating the sum of the received signals.

4. The method of claim 1, wherein the converting to a codeword comprises performing an exclusive or (XOR) operation on the received signals.

5. The method of claim 1, wherein the converting to a codeword comprises mapping the sum of the received signals to 0s and 1s using a mapping table.

6. The method of claim 1, further comprising:

reconstructing the coded signal to a signal form used before the conversion to the codeword; and transmitting the reconstructed signal to the first transmitting apparatus and the second transmitting apparatus.

7. An apparatus of a Relay Station (RS) for supporting Decode and Forward (DF) relaying in a wireless communication system, the apparatus comprising:

a receiver for receiving signals from a first transmitting apparatus and a second transmitting apparatus in the same time resources; and a transmitter for transmitting a sum of the received signals to the first transmitting apparatus and the second transmitting apparatus in the same time resources, wherein the receiver comprises:

a reception part for receiving the signals from the first transmitting apparatus and the second transmitting apparatus;

a demodulator for demodulating the sum of the received signals using a modulation scheme; and a decoder for converting the demodulated signal to a codeword and decoding the codeword using a coding rate, wherein the decoder comprises:

a codeword generator for converting the demodulated signal to the codeword; and a decoding portion for decoding the codeword using the coding rate, wherein the decoding comprises channel information of a link between the RS and at least one of the first transmitting apparatus and the second transmitting apparatus.

8. The apparatus of claim 7, wherein the codeword generator generates the codeword by at least one of modulo-operating the sum of the received signals and performing an exclusive OR (XOR) operation on the sum of the received signals.

9. The apparatus of claim 7, wherein the codeword generator generates the codeword by mapping the sum of the received signals to 0s and 1s using a mapping table.

10. The apparatus of claim 7, wherein the transmitter comprises:

an encoder for encoding a demodulated codeword received from the receiver at least one of the same coding rate as the receiver and a different coding rate from the receiver; and a transmission part for transmitting the coded signal to the first transmitting apparatus and the second transmitting apparatus, wherein the encoding comprises channel information of a link between the RS and at least one of the first transmitting apparatus and the second transmitting apparatus.

11. The apparatus of claim 10, wherein the transmitter further comprises a reconstructor for reconstructing the encoded demodulated codeword to a signal form used before the conversion to the codeword in the receiver, and wherein the transmission part transmits the reconstructed signal to the first transmitting apparatus and the second transmitting apparatus.

* * * * *